Figure 1:
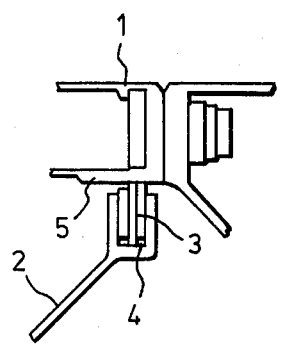

United States Patent [19]

Moore

[11] 4,358,120
[45] Nov. 9, 1982

[54] SEALS

[75] Inventor: Alan Moore, Bristol, England

[73] Assignee: Rolls Royce Limited, London, England

[21] Appl. No.: 262,502

[22] Filed: May 11, 1981

[30] Foreign Application Priority Data

May 31, 1980 [GB] United Kingdom ............... 8017887

[51] Int. Cl.³ .................................................. F16J 9/16
[52] U.S. Cl. ..................................... 277/192; 277/53; 277/216
[58] Field of Search .................. 277/53, 216, 218, 193

[56] References Cited

U.S. PATENT DOCUMENTS

| | | | |
|---|---|---|---|
| 2,877,071 | 3/1959 | Arnot | 277/216 |
| 3,759,148 | 9/1973 | Geffroy | 277/193 |
| 3,811,690 | 5/1974 | Moriarty | 277/218 |
| 3,917,150 | 11/1975 | Ferguson | 277/53 |
| 4,202,554 | 5/1980 | Snell | 277/53 |
| 4,331,337 | 5/1982 | Cross | 277/216 |

*Primary Examiner*—Robert I. Smith
*Attorney, Agent, or Firm*—Stevens, Davis, Miller & Mosher

[57] ABSTRACT

The invention relates to piston ring seals. In such seals, manufacturing tolerances, distortions, or wear of the ring itself, or of the sealing surface which it contacts can cause out-of-roundness which produces areas of non-contact between the two components of the seal allowing leakage. The present invention overcomes this problem by providing the piston ring (12) FIG. 3, with a plurality of resilient, tightly packed bristles (18) which are contained within the circumference of the ring where the ring circumference contacts the corresponding sealing surface (5) but which can spring out into contact with the sealing surface over areas where the ring loses contact with it. In the example shown, the bristles project both from the radially inner and outer circumferences and are angled in opposite directions to enable the seal to be rotated into position.

5 Claims, 4 Drawing Figures

SEALS

The present invention relates to seals of the piston-ring type between non-relatively rotating components, and includes both a seal element and a seal assembly including a seal element.

A piston ring seal contacts surfaces on an adjacent sealing member both at its circumference and on one of its faces. Due to manufacturing tolerances, distortions, or wear, in use, the contacting surfaces can become out-of-round, or relative movements can take place, in use, between the components, both of which can cause leakage paths to open for fluid to escape around the seal.

This problem is overcome in the present invention by providing a seal element in which a mass of tightly-packed resilient bristles are provided sandwiched between the piston ring and an additional ring so as to project into any spaces which may be formed between the piston ring and the mating sealing surface.

By this means a seal can be maintained by the bristles even when contact is lost between an area of the surface of the piston ring and its mating sealing surface.

According to the present invention a seal assembly comprises two non-relatively rotating components, a split piston ring carried on one of the components and dimensioned to contact a co-operating sealing surface of the other component around one circumference, an annular mass of tightly-packed resilient bristles sandwiched between the piston ring and a second ring, the bristles lying at an angle to the radial direction and being dimensioned to lie within said circumference of the piston ring when said circumference is in contact with the co-operating sealing surface, and to project from said circumference into contact with the co-operating sealing surface when the piston ring loses contact therewith.

In a preferred embodiment of the invention the piston ring is carried in a channel in the component on which it is mounted, and the bristles also project from the other circumference of the ring at an angle to the radial direction into contact with the base of the channel in order to provide a seal between the ring and the base of the channel. In this embodiment the bristles at each of the circumferences are preferably inclined to the radial direction in opposite senses.

The second ring may also act as a piston ring and extend into sealing contact with the sealing surface of the other component.

Also according to the present invention a seal for use between two non-relatively rotating components comprises a split ring adapted to be carried on one of the components and a circumference of which is dimensioned to contact, in use, a co-operating sealing surface provided on the other component, an annular mass of tightly-packed resilient bristles sandwiched between the ring and a second ring, the bristles lying at an angle to the radial direction and being dimensioned to project from said circumference of the ring when free, but to be within said circumference where the ring contacts the co-operating sealing surface of the other component.

Figure 3:
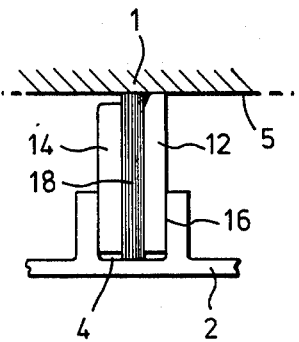
Figure 2:
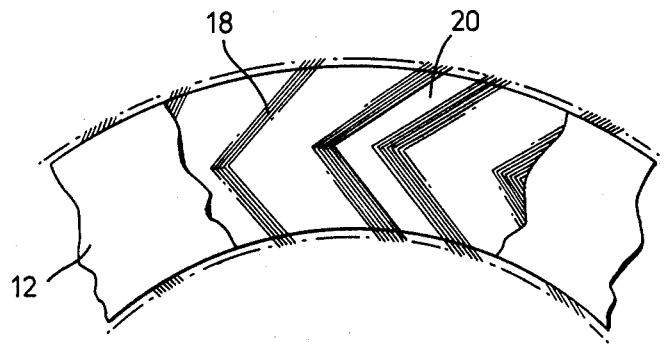
Figure 4:
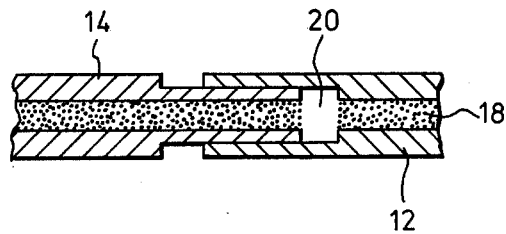

The invention will now be more particularly described, by way of example only, with reference to the accompanying drawings in which:

FIG. 1 is a side elevation of part of a gas turbine engine showing an example of a seal assembly of the present invention, FIG. 2 is a side elevation of the seal with part of one of the rings broken away, FIG. 3 shows a sectional elevation of the seal of FIG. 1, and FIG. 4 a sectional plan view of the seal of FIG. 2.

Referring now to the drawings there is shown a typical example of an area in a gas turbine engine where static seals are required between two non-relatively rotating components.

The two components are casing elements 1 and 2 where a joint is required, which allows for relative movements between the components while preventing leakage of working fluid therethrough. The relative movements may be occasioned by differential thermal expansions of the components, vibrations, or even gas pressures in the engine. A seal 3 is carried in an annular channel 4 on the casing element 2 and forms a seal with a sealing surface 5 on the casing element 1.

The seal itself is shown in more detail in FIGS. 2, 3 and 4 from which it can be seen that the seal consists of a piston ring 12, the function of which is to contact an adjacent sealing surface 5, around its periphery, and to make face contact around a sidewall 16 of the channel 4. The circumference of the ring is dimensioned to make line contact around the adjacent sealing surface 5.

A second ring 14 is provided alongside the piston ring 12 and a mass of tightly-packed resilient bristles 18 is sandwiched between the two rings. The bristles are dimensioned to project from the radially inner and outer circumferences of the piston ring 12 when free, but are arranged to be at an angle to the radial direction so that they are capable of bending inwardly when the piston ring is fitted into position.

As in conventional piston rings, the seal element is split in order to enable it to be squeezed into position whereby its own resilience keeps the radially outer circumference in contact with the adjacent sealing surface to prevent fluid flow over the top of the seal element. The other main seal is formed by the face of the ring on the low pressure side of the seal being urged into contact with the side face 16 of the channel by the pressure of the fluid.

In the example shown, the bristles at the radially outer circumference of the piston ring are arranged in their free state to project just far enough to take up any out-of-roundness between the piston ring and the sealing surface. Hence when the piston ring is fitted, the bristles must be capable of bending inwardly to enable the piston ring to contact the sealing surface. Where the piston ring fails to make contact with the sealing surface the resilience of the bristles enables them to spring out into contact with the sealing surface to maintain the seal.

The bristles at the radially inner circumference are arranged to be long enough to take up not only any out-of-roundness on the inner surfaces, but also any tolerances or relative radial movements of the two components, and thus provide a seal on the radially inner circumference as well.

It can be seen from FIG. 2 that the bristles projecting from the radially outer and inner circumferences do so with opposite inclinations to the radial. This enables the seal element to be rotated during assembly with minimum damage to the bristles. A seal of this sort would be made by welding the bristles and the rings together along a line joining the intersections of the bristles.

FIG. 4 shows the region of the split 20 of the seal element and illustrates the manner in which the two rings can overlap at the split to minimise leakage.

The second ring 14 may additionally act as a piston ring to provide a further line of contact between the seal element and the adjacent sealing surface. Alternatively, the second ring may be of lesser radial depth than the ring 12 and act only as a support member for the bristles.

The bristles in the gas turbine application of the seal described above are made of metal and are welded or otherwise integrally joined to metal rings. However, where the environment is less harsh than a gas turbine engine, other materials for example plastics may be used.

I claim:

1. A seal assembly comprising two non-relatively rotating components, a split piston ring carried on one of the components and dimensioned to contact a co-operating sealing surface of the other component around one circumference, an annular mass of tightly-packed resilient bristles sandwiched between the piston ring and a second ring, the bristles lying at an angle to the radial direction and being dimensioned to lie within said circumference of the piston ring when said circumference of the piston ring is in contact with the co-operating sealing surface, and to project from said circumference into contact with the co-operating sealing surface when the piston ring loses contact therewith.

2. A seal assembly according to claim 1 and in which said one component has an annular channel into which the piston ring is fitted.

3. A seal assembly according to claim 2 and in which the bristles project outwardly from the radially outer circumference of the piston ring into any clearances between the ring and the sealing surface and also project inwardly from the radially inner circumference of the piston ring into contact with the base of the channel.

4. A seal assembly according to claim 3 and in which the bristles projecting from the radially inner circumference are inclined to the radial direction in the opposite sense to the bristles projecting from the radially outer circumference.

5. A seal adapted for use in a seal assembly as claimed in any one of the preceding claims and which comprises a split ring adapted to be carried on one of the components and a circumference of which is dimensioned to contact, in use, a co-operating sealing surface provided on the other component, an annular mass of tightly-packed resilient bristles sandwiched between the ring and a second ring, the bristles lying at an angle to the radial direction and being dimensioned to project from said circumference of the ring when free, but to be within said circumference where the ring contacts the co-operating sealing surface of the other component.

* * * * *